US008386491B2

(12) United States Patent
Bossmeyer et al.

(10) Patent No.: US 8,386,491 B2
(45) Date of Patent: Feb. 26, 2013

(54) SYSTEM AND METHOD FOR UTILIZING ORGANIZATION-LEVEL TECHNOLOGY DEMAND INFORMATION

(75) Inventors: Hans-Juergen Bossmeyer, Germering (DE); Guido Prick, Munich (DE); Martin Ertl, Munich (DE); Michael Rath, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 481 days.

(21) Appl. No.: 12/111,471

(22) Filed: Apr. 29, 2008

(65) Prior Publication Data
US 2009/0271393 A1 Oct. 29, 2009

(51) Int. Cl.
*G06F 7/00* (2006.01)
*G06F 17/30* (2006.01)
(52) U.S. Cl. .................. 707/740; 707/748; 707/749
(58) Field of Classification Search .............. 707/737, 707/738, 740, 748, 749
See application file for complete search history.

(56) References Cited

U.S. PATENT DOCUMENTS

| 7,185,009 | B2* | 2/2007 | Yang et al. | 1/1 |
| 7,885,987 | B1* | 2/2011 | Lee | 707/923 |
| 2003/0182174 | A1* | 9/2003 | Kalish et al. | 705/10 |
| 2003/0229470 | A1* | 12/2003 | Pejic | 702/179 |
| 2003/0233354 | A1* | 12/2003 | White et al. | 707/3 |

OTHER PUBLICATIONS

European Search Report, dated Jul. 23, 2009.

* cited by examiner

*Primary Examiner* — Mariela Reyes
(74) *Attorney, Agent, or Firm* — Crowell & Moring LLP

(57) ABSTRACT

A plurality of subtechnologies may be identified in which each of the plurality of subtechnologies is characterized by a common granularity level. The organization-level demand and/or expertise for each of the identified plurality of subtechnologies may also be identified. Thereafter, a corresponding plurality of subtechnology profiles may be generated, which include a corresponding organization-level demand and/or expertise, as well as other subtechnology attributes. In one embodiment, the generated subtechnology profiles may then be stored in a common technology database. The technology database may be searched based on user queries entered via the common graphical user interface. The subtechnology search results may be ranked based, at least in part, on a quantitative comparison of the subtechnology's general relevance to the user, with the internal relevance to the user's company or organization.

20 Claims, 12 Drawing Sheets

SYSTEM AND METHOD FOR UTILIZING ORGANIZATION-LEVEL TECHNOLOGY DEMAND INFORMATION

CROSS REFERENCE TO RELATED APPLICATIONS

This application is related to U.S. patent application entitled SYSTEM AND METHOD FOR PROVIDING AND MANAGING TECHNOLOGY-BASED INFORMATION, and U.S. patent application entitled SYSTEM AND METHOD FOR UTILIZING TECHNOLOGY INTER-CONNECTIVITIES, both of which are filed on even date herewith.

FIELD OF THE INVENTION

The present invention relates in general to technology-based information, and more particularly to a novel methodology for utilizing organization-level technology demand information and/or expertise.

BACKGROUND OF THE INVENTION

It is a well known fact the technological landscape today is extremely diverse and evolving at incredible rates. Technologies new and old, simple and complex are being developed at a rate that makes it difficult for a business to keep track, and from the standpoint of industry leaders that rely on the cutting-edge, an efficient management system geared towards minimizing this difficulty is a practical necessity.

There are of course known databases available, including the popular public resources of Google™, Wikipedia™ and numerous other searching resources. One additional private resource is known as the Engineering Village™, which is a collection of several research databases covering a wide variety of research reports, trade journals and conference proceedings. The information included in all these resources, though vast, is unfortunately disorganized, one dimensional and in many cases repetitive.

Although most, if not all, of the these searching resources have advanced searching capability that allows users to search over a wide variety of search terms, all such searching capabilities are textually-based. Thus, while it may be possible to narrow search results by including or excluding certain terms, there is no possibility to search for concrete relationships with other potentially relevant technologies. In that sense, the currently available searching resources are, at most, information resources, and not knowledge resources.

BRIEF SUMMARY OF THE INVENTION

Disclosed and claimed herein are systems and methods for utilizing organization-level technology demand information. In one embodiment, a method includes identifying a plurality of subtechnologies, wherein each of the plurality of subtechnologies is characterized by a common granularity level, identifying subtechnology demand information for one or more of the plurality of subtechnologies, and generating a plurality of subtechnology profiles corresponding to the plurality of subtechnologies based on a set of predefined technology attributes including the subtechnology demand information. The method further includes receiving a subtechnology query, and ranking a plurality of subtechnology search results based on the subtechnology demand information.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Overview of the Disclosure

Figure 1:
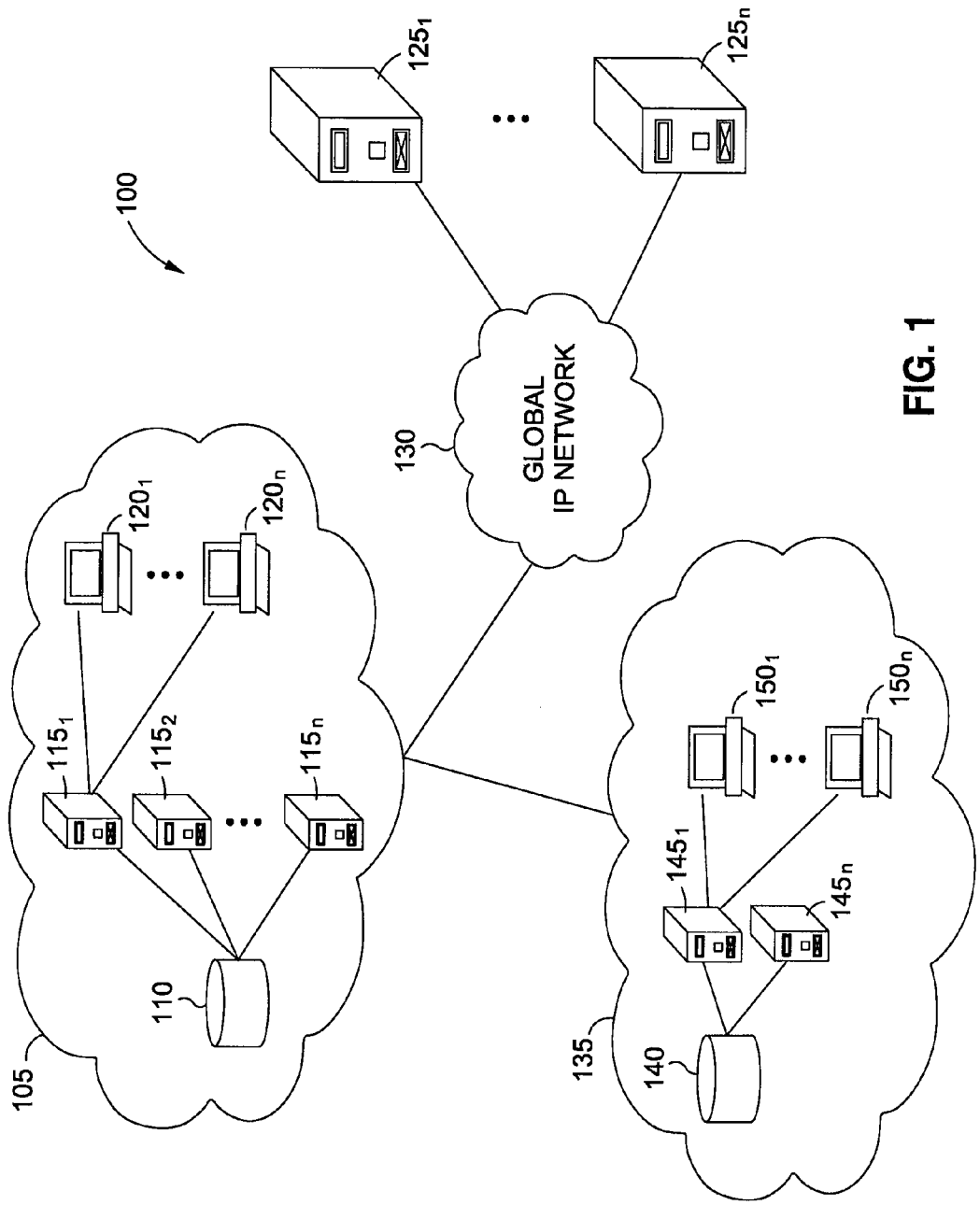
FIG. 1 depicts a simplified system diagram as may be employed by one or more embodiments.

One aspect of the invention relates to identifying a plurality of subtechnologies, wherein each of the plurality of subtechnologies may be defined or characterized by a common granularity level. Thereafter, the organization-level demand and/or expertise for each of the identified plurality of subtechnologies may correspondingly be identified. In one embodiment, this organization-level demand and/or expertise may be represented by a set of subtechnology attributes and may provide the ability to both link the internal demand for the underlying information with the external information itself.

Once the plurality of subtechnologies and their corresponding organization-level demands have been properly identified, a corresponding plurality of subtechnology profiles may be generated. In one embodiment, these subtechnology profiles may include the organization-level demand and/or expertise corresponding to each of the plurality of subtechnologies, as well as other subtechnology attributes. In one embodiment, the generated subtechnology profiles may then be stored in a common technology database, to which access may be provided using a common user interface.

Another aspect of the invention is to provide user access to the subtechnology profiles. In one embodiment, this may be done by receiving a subtechnology search query via a common graphical user interface. While in one embodiment this query may be a Boolean keyword query, in another embodiment the query may be comprised of a technological subject, problem or desired solution. Based on the received query, the previously-generated plurality of subtechnology profiles may be searched. In one embodiment, a plurality of subtechnology search results may be ranked based on the previously-identified organization-level demand information. In this fashion, the most relevant technologies, not only to a particular engineering discipline, but also to a particular organization, may be quickly identified. In other embodiments, the ranking of the subtechnology search results may be based, at least in part, on a quantitative comparison of the subtechnology's general relevance to the user, with the internal relevance to the user's company or organization.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, A, B or C means any of the following: A; B; C; A and B; A and C; B and C; A, B and C. An exception to this definition will occur only when a combination of elements, functions, steps or acts are in some way inherently mutually exclusive. Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, a fiber optic medium, etc.

The Concept of Subtechnologies

As used herein, the term "considered technology" refers to any technology being considered by a project that can be broken down into various broad, but fundamental working systems. The term "proper technology" is any technology that represents the physical implementation of one of a considered technology's fundamental working systems. In addition, a "technological function" is any scientifically based purpose that is necessary for the proper or desired operational effect of a fundamental component of a proper technology.

A "physical effect" describes the scientific mechanism or process behind the characteristic effects resulting from, or used as a basis for the normal operation of a subtechnology that allows it to fulfill a technological function.

In addition, a "technology family" is a group of technologies that are related in a way where they all fall under a common theme, but where the theme is so broad that the technologies cannot be considered as any type of proper or improper variant of one another. Note: a technology field is any group of technology families related in a similar fashion.

In its broadest sense, a "subtechnology" is an area of field of technology having a granularity between that of a technology family and a physical effect. A subtechnology may refer to a technology component of a proper technology that provides a way to fulfill a technological function of that proper technology, and which also exhibits a set of common characteristics. In one embodiment, the common characteristics of a subtechnology may be that:

a. it's variants should not 'proliferate to excess';
b. it should be a physical representation of one or more specific physical effects, and not a physical effect itself;
c. it should be less granular than a technology family; and
d. it should not be a product itself, rather it can be the working principle behind a product.

With reference to the term "proliferate to excess," if a technology has either so many proper variants that it becomes practical to call them all different technologies instead of variants of one technology, or the technology has one or more improper variants, then it may be said that the technological concept has variants that 'proliferate to excess.'

A proper variant is any modified version of something that fulfills the same purposes, but that does not differ so much from the original entity that it becomes more useful or practical to consider the modified version as unique in itself rather than a variant of the original entity. In contrast, an improper variant is any modified version of something that does not fit the description of a proper variant.

The concept of what a subtechnology is rooted in understanding that technologies can be divided into levels of granularity. In short, in order to profile a subtechnology, one must first determine the optimal granularity level for a technological area. For example, a subtechnology profile of a sport utility vehicle is less likely to be helpful to an innovation engineer than a profile for organic light-emitting diodes. Thus, one aspect of the invention is to filter technologies into those that aptly reflect this optimal complexity level and focus on their functional contribution or utilization. This may have the further benefit of reducing the technological complexities caused by interconnectivity identification since there is a focus on the functionality of the underlying subtechnology and not the application thereof.

As previously mentioned, a subtechnology may be said to have a granularity between that of a technology family and a physical effect (such as electroluminescence). When using the concept of a physical effect in conjunction with the process of creating a technology profile, the subtechnology's attributes (described below) can be used as a signal to help identify unfavorably granular technologies. It should also be noted, however, that the field/family structure may be only semi-permanent, meaning that as the technological landscape changes and new fields or families emerge, the structure may change as well.

In one embodiment, the invention achieves this granular filtering of technology into subtechnologies by systematically applying a set of guidelines and refinement routines to a technological concept until either a suitable or optimal subtechnology profile is achieved, or the technological concept is deemed outside the optimal complexity level and thus excluded from the database. These predetermined guidelines and refinement routines may be referred to as profile creation procedures, and may further include a description of what type of information should be entered into the individual attributes, how the information should be recorded, and documentation on where in the field/family structure for the subtechnology is organized.

Subtechnologies having unfavorable granularities may be classified umbrella technologies, product engineering technologies, and exceedingly granular technologies. Umbrella technologies, such as energy harvesting, are technologies that fit the pragmatic definition of subtechnology, but that are more of a collection of individual, more optimal subtechnologies. Product engineering technologies, such as combustion engines, are those that represent the engineering behind a specific product rather than the technique behind a subtechnology. A better example would be hydrogen combustion, which has application in combustion engines, but represents the technique behind the combustion and not just combustion itself. Exceedingly granular technologies, such as electroluminescence, are technologies that exist more optimally as an attribute (here, a physical effect) of a subtechnology rather than as a stand-alone subtechnology. Proper definition of the attributes for a considered technology should effectively filter out the more optimal granularities, and the profile creation procedure is designed around this.

By way of example, consider the electric drivetrain of a battery electric vehicle. Proper technologies may include the battery system, transmission or drivetrain, and drive dynamic control systems. The components of the battery system may include the battery itself (various types), the battery operation management system, and the battery energy management system (cooling, insulating). Similarly, the components of drive dynamic control systems may include the brake system (energy harvesting potential for charging battery or powering supplementary systems such as air conditioner or stereo), suspension system (same energy harvesting potential), driver feedback systems (dashboard gauges, throttle controls, power steering, etc.), and the automated traction control systems (ABS, 4WD, AWD, ESP, etc.).

With the proper technologies identified, again by way of example only, we may consider whether energy harvesting is a true or relevant subtechnology. First, we identify a common granularity level for our subtechnologies and, once determined, apply the same of criteria across our set of proper technologies. This common granularity may be determined by answering the following questions, although it should of course be appreciated that other criteria may be used in defining the granularity level and/or determining a relevant subtechnology:

a. Can it be a technological component of a proper technology?
b. Can it fulfill a technological function of a proper technology?
c. It's variants don't proliferate to excess (green means they don't)?
d. Is it a physical representation of greater than a physical effect?
e. Is it less granular than a technology family?
f. It's not a product, rather it can be a working principle behind a product?

In this example, we are considering energy harvesting, which is the process by which energy is captured and stored for further use. With respect to the first question set forth above, we see that it can not be a physical component of a proper technology, because by definition it is a process, not a physical thing. With respect to the second question, while energy harvesting can be the technological function of a proper technology, the abstract idea of energy harvesting itself is not a physical component that can accomplish it. For the third question, energy harvesting can be many different unique technologies (water turbine, running shoe, knee implant, etc.). For the fourth question, energy harvesting does not fit the definition of a physical effect because it is the characteristic effect related to the normal operation of a subtechnology, not an explanation of the scientific mechanism or process behind it. For the fifth question, energy harvesting is less granular than a technology family, because all of its variants have such a similar working purpose. And finally, energy harvesting is not a product, but can be the working principle behind one. Since we were not able to answer all of the criteria in the affirmative, energy harvesting would not be a subtechnology under our chosen criteria.

Another example is piezoelectronic damping systems, which are electrical systems that utilize the piezoelectric effect of a material to generate electricity that regulates an actuator for the purpose of damping the motion of that material. We answer the granularity questions chosen for this example as follows:

Question 1: It could be a component of an intelligent suspension system.
Question 2: It could help with variable shock absorption.
Question 3: It does not have myriad variants, just scaled variants, and variants on type of piezoelectric material used.
Question 4: It is a physical representation of the piezoelectric effect in use.
Question 5: It is less granular than a technology family.
Question 6: It is not a product itself, but it can be used as a basis for one.

Based on affirmative answers to each of the above questions, we can conclude that piezoelectronic damping system is a subtechnology. Again, it should be noted that the specific criteria used to define the common granularity level and hence, when something is a subtechnology, may vary, and the criteria applied herein to define the granularity level should not be limiting.

One final example is H2-combustion, which is the exothermic chemical reaction between hydrogen and oxygen that produces water vapor and energy. We may answer the granularity questions chosen for this example as follows:

Question 1: It can be a technological component of an engine or motor.
Question 2: One technological function of an engine or motor is to convert chemical bond energy, and H2-Combustion certainly does that.
Question 3: The only real variants are if you add fuel aggregates into the mixture, but those do not seem to proliferate to excess.
Question 4: Combustibility fits the description of a physical effect, and H2-Combustion is a physical representation of it.
Question 5: It is less granular than a technological family.
Question 6: It is not a product, but it can be used as a basis for an H2-Combustion based product.

Based on affirmative answers to each of the above questions, we can conclude that H2-combustion is also a valid subtechnology according to the chosen criteria applied for the granularity level of this example.

Table 1 below summarizes the results of the above-described examples, as well as a few additional examples.

TABLE 1

Summary of Possible Subtechnologies

|   | | Energy Harvesting | Piezo-electronic Damping Systems | H2-Combustion | H2-Combustion Motor | Polymer Batteries | Li-Ion Polymer Batteries | Tesla Roadster Battery System | Energy Management |
|---|---|---|---|---|---|---|---|---|---|
| i | Can it be a technological component of a proper technology? | N | Y | Y | N | Y | Y | N | N |
| ii | Can it fulfill a technological function of a proper technology? | N | Y | Y | N | Y | Y | N | N |
| iii | It's variants don't proliferate to excess (green means they don't)? | N | Y | Y | Y | N | Y | Y | N |
| iv | Is it a physical representation of $\geq 1$ physical effect, and not one itself? | N | Y | Y | Y | Y | Y | Y | N |
| v | Is it less granular than a technology family? | Y | Y | Y | Y | Y | Y | Y | N |
| vi | It's not a product, rather it can be a working principle behind a product? | Y | Y | Y | Y | Y | Y | N | Y |
| vii | Therefore is it a relevant subtechnology? | N | Y | Y | N | N | Y | N | N |

Exemplary Network Overview

As depicted in FIG. 1, a simplified system diagram is provided for an extended data network 100 configured to implement one or more embodiments of the invention. As shown, extended network 100 includes an organization-level network 105. While in one embodiment, the organization-level network 105 may correspond to a single company or business, it should equally be appreciated that the organization-level network 105 may relate to other organization levels as well (e.g., country, institution, industry, etc.). Regardless, the organization-level network 105 is comprised of a technology database 110 which, as will be described in detail below, may contain detailed information on a collection of technologies. As shown, the technology database 110 may be accessible through one or more servers $115_1$-$115_n$. The servers are, in turn, accessible by one or more work stations $120_1$-$120_n$. Alternatively, the technology database 110 may be directly accessible by the work stations $120_1$-$120_n$. In certain embodiments, the work stations $120_1$-$120_n$ may be configured to execute software which generates a graphical user interface (GUI) specially designed to interface with the technology database 110 and to access the underlying information stored therein. In this fashion, individuals associated with the organization (e.g., employees, contractors, etc.) may access the technology database 110 via the database GUI of the work stations $120_1$-$120_n$. It should of course be appreciated that the technology database 110 may be a single database or a collection of individual databases.

Continuing to refer to FIG. 1, the organization-level network 105 may optionally be able to access one or more third-party servers $125_1$-$125_n$ over a global network 130 (e.g., the Internet). Such third-party servers $125_1$-$125_n$ may correspond to publicly-accessible online information sources, as well as to subscription based sources. In one embodiment, the technology database 110 may be populated with information obtained from the third-party servers $125_1$-$125_n$.

The extended network 100 of FIG. 1 further depicts the organization-level network 105 as optionally being able to communicate with an external organization-level network, such as network 135. As with the organization-level network 105, the external organization-level network 135 may correspond to a single company or business, or to any other type of organization (e.g., country, institution, industry, etc.).

The external organization-level network 135 of FIG. 1 also includes a technology database 140 that is accessible through one or more servers $145_1$-$145_n$, and in turn, by one or more work stations $150_1$-$150_n$. In this fashion, the organization-level network 105 may share information with other organizations, thereby potentially improving the quantity and quality of the information available to, or stored on, the technology database 110.

Exemplary Embodiments of the Invention

Figure 2A:
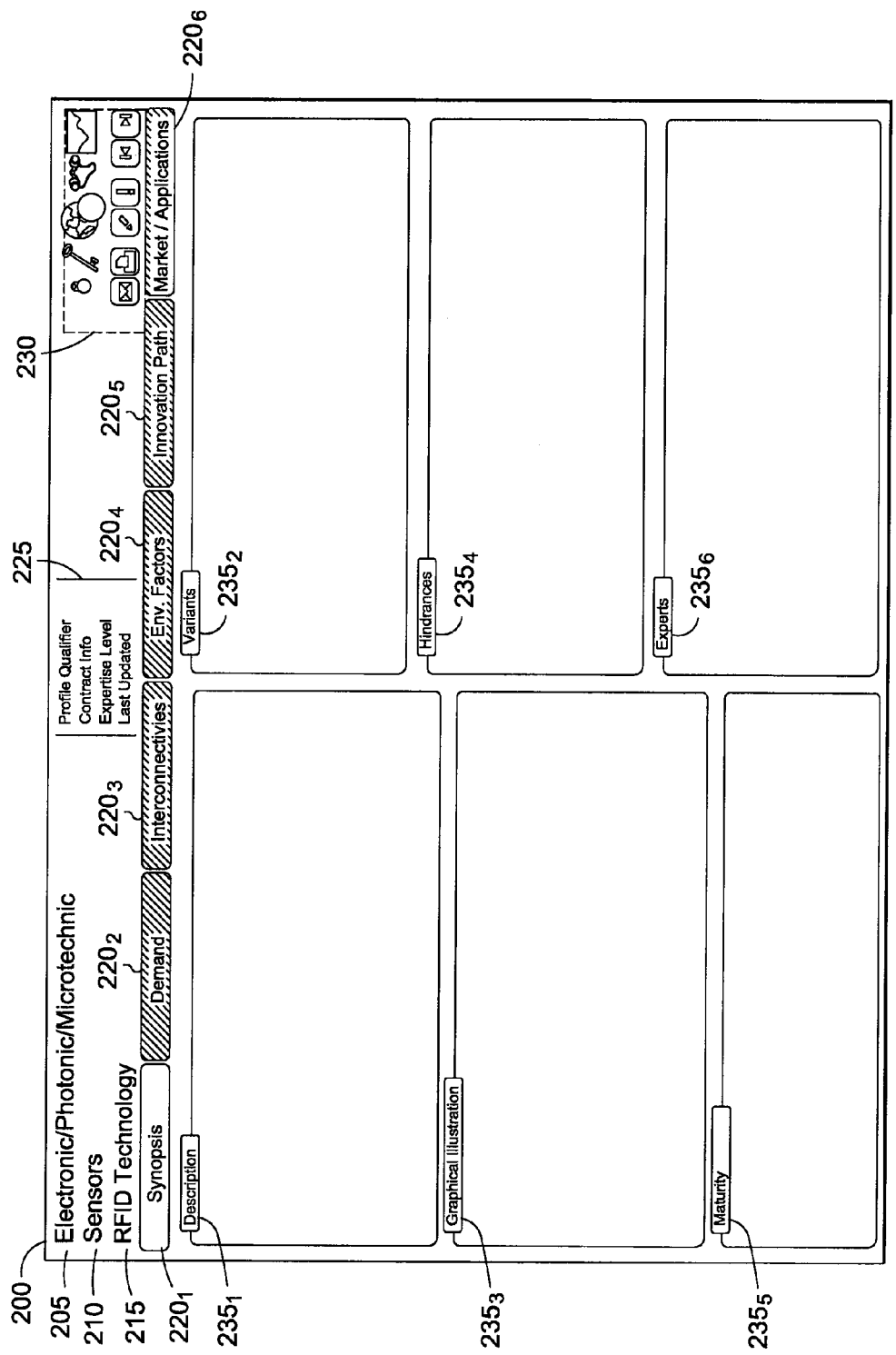
FIGS. 2A-2H depict various graphical user interfaces for implementing one or more aspects of the invention.

Referring now to FIG. 2A, depicted is one embodiment of a GUI template 200 configured in accordance with the principles of the invention to enable the systematic profiling of subtechnologies. In one embodiment, the GUI template 200 may be accessed from a work station (e.g., work stations $120_1$-$120_n$) of an organization-level network (e.g., network 105). The GUI template 200 may be configured to enable a user to profile a given subtechnology into a technology database (e.g., technology database 110) in accordance with a field/family structure.

With respect to the field/family structure, every technology is relevant to a certain field, such as materials, electronics, energy or resources. Such areas are referred to herein as technology fields and their related subcategories as technology families. In the embodiment of FIG. 2A, the technology field 205 is the field of electronic/photonic/microtechnic, while the technology family 210 is sensors. Below the technology family 210 is the subtechnology 215 level. In the embodiment of FIG. 2A, the subtechnology 215 level is radio frequency identification technology, or RFID.

Continuing to refer to FIG. 2A, the GUI template 200 may be further comprised of profile creation logistics 225 and one or more database interaction buttons 230. While any assortment of profile creation information may be included in the profile creation logistics 225, in one embodiment the individual (or group of individuals) who identified, reviewed and qualified/developed the attribute profile may be included (i.e., profile qualifier). In one embodiment, the database interaction buttons 230 may correspond to printing or emailing a given subtechnology profile, navigating through a sequence of subtechnology profiles, marking or highlighting profiles for later access, and so on.

However, the primary component of any subtechnology profile is the subtechnologies attributes. Subtechnology attributes are a predetermined collection of technology-based attributes, shown as attributes $235_1$-$235_6$ in FIG. 2A, which are organized into one or more categories, shown as categories $220_1$-$220_6$. In one embodiment, each category may be separately selectable by clicking on any one of the category tabs (i.e., tabs $220_1$-$220_6$).

As will be described below, each category may have a number of associated attributes relating to the given subtechnology (i.e., subtechnology 215). Attributes, as a whole, may be described as a set of predetermined traits that, when defined, may encompass everything from the basic description of a subtechnology to the intricate channels through which the world affects it, and it affects the world. Each individual attribute may contain a clip of information that outlines or describes a particular facet of a technology's existence and function. This full collection of a technology's attributes may be referred to as a subtechnology profile. In one embodiment, the attributes may be same regardless of the particular subtechnology being profiled. That is, the attributes may be constant across all subtechnologies in order to be able to uniformly compare subtechnologies.

It should be appreciated that while certain attributes and categories are illustrated with respect to FIGS. 2A-2H, these are meant as examples only and should not limit the scope of the invention.

Figure 2B:
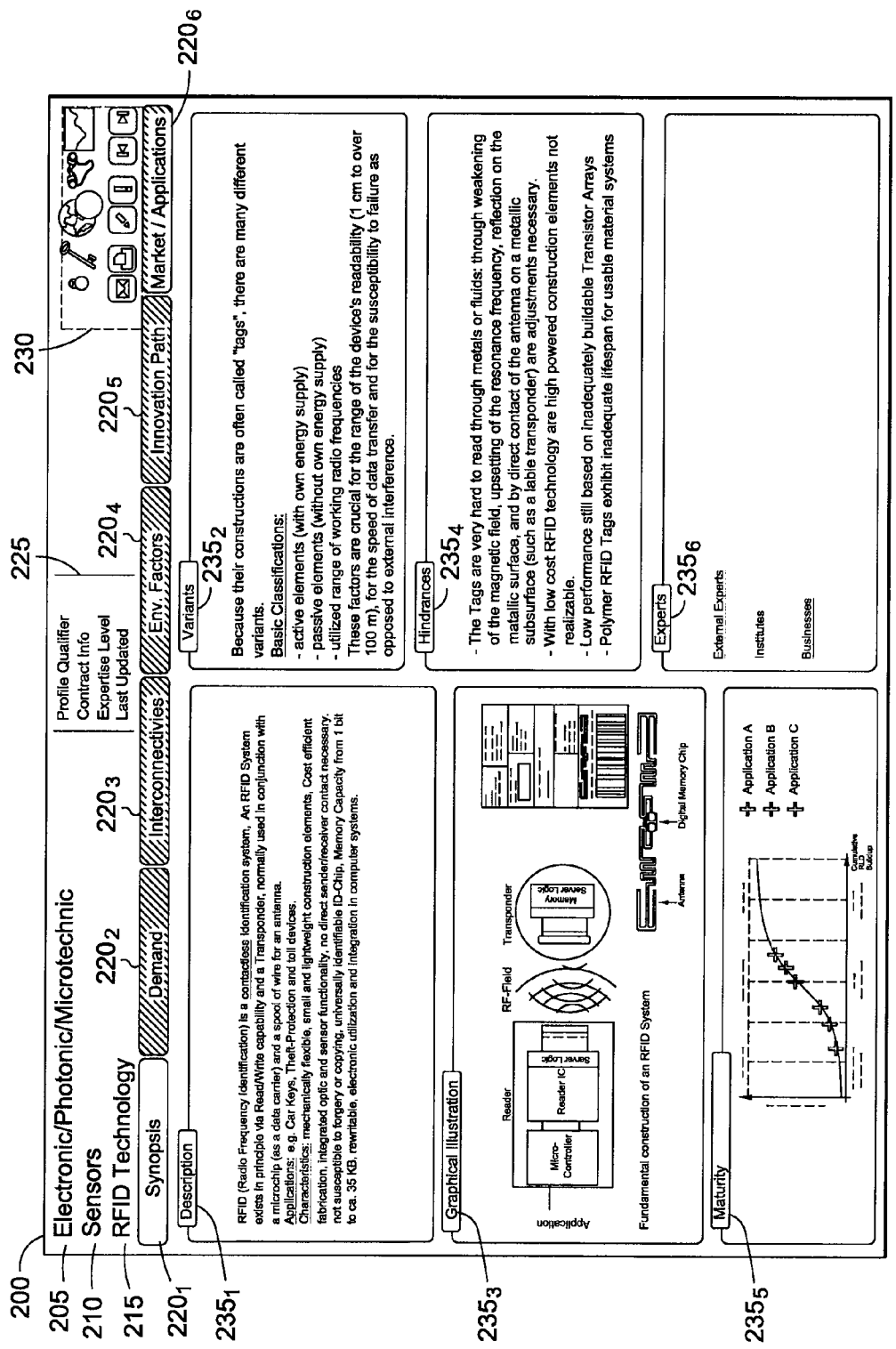

Referring now to FIG. 2B, depicted is the GUI template 200 of FIG. 2A after the various attributes $235_1$-$235_6$ have been populated with the appropriate information. In the embodiment of FIG. 2B, the synopsis tab $220_1$ has been selected and the attributes associated therewith displayed. In particular, a description attribute $235_1$ may be the used to described the subtechnology's 215 general characteristics, features and properties. The variants attribute $235_2$ may be used to describe any variations on the subtechnology 215, which in this case is RFID technology. The graphical illustration attribute $235_3$ may be used to include representative visual information, the hindrances attribute $235_4$ may be used to describe any known limitations on the subtechnology 215, the maturity attribute $235_5$ may be used to provide an estimate on how far along we are in the expected life of the subtechnology 215, and known experts in the field may be identified in the experts attribute $235_6$.

Figure 2C:
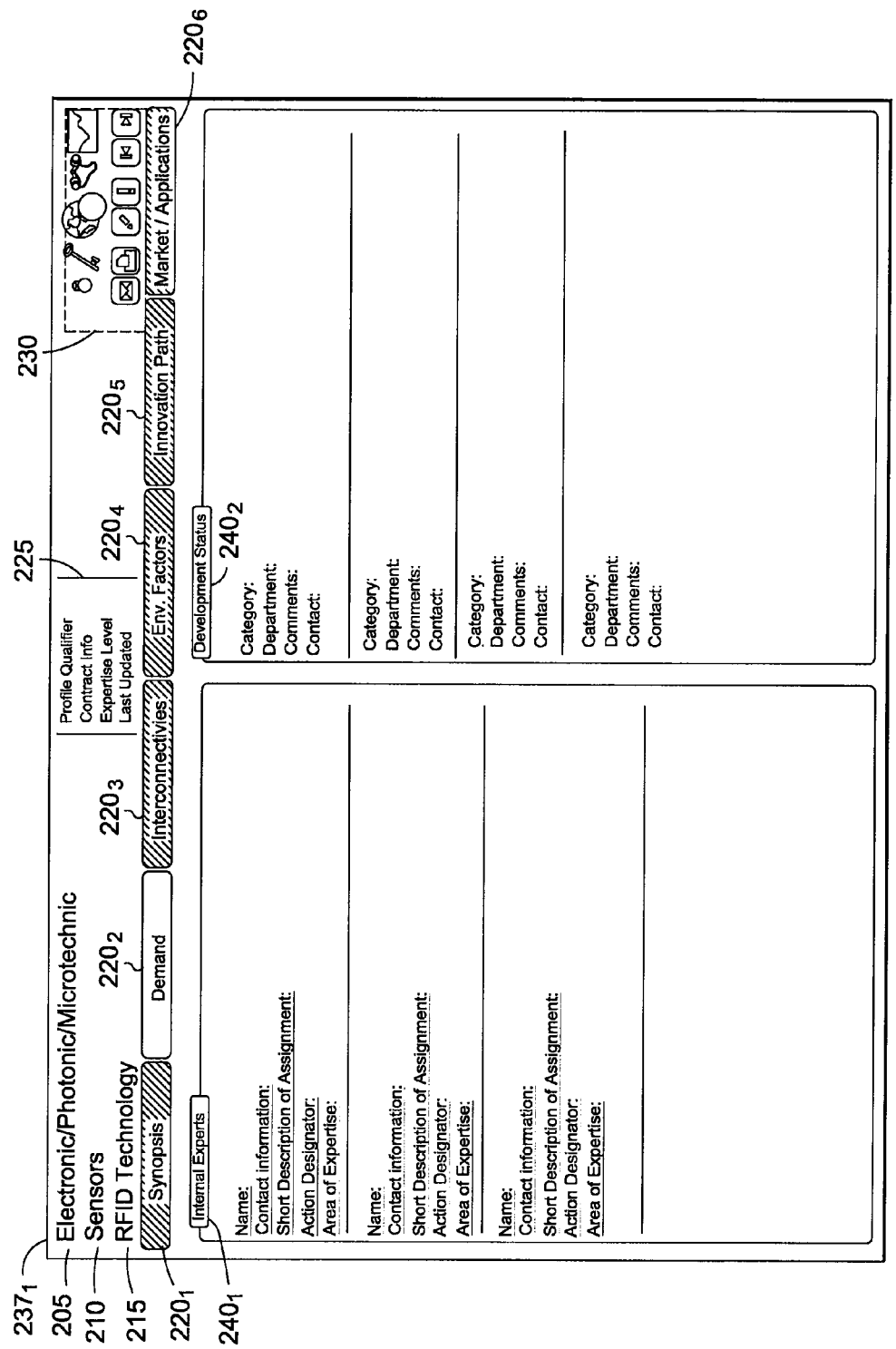

It has been found that simply making technological solutions achievable isn't quite enough unless they are connected with the relevant projects and personnel within a business or company utilizing the invention. Thus, another aspect of the invention is to include the organization-level demand for the subtechnology as a category of attributes in the subtechnologies profile. In short, the demand for a subtechnology may be a set of attributes with the ability to both link the internal demand for the underlying information with the external information itself. In certain embodiments, the invention may also provide a quantitative comparison of a technology's general relevance with the internal relevance potential as it relates to a given company. To that end, FIG. 2C depicts an embodiment of another GUI $237_1$ after the demand category tab $220_2$ for the subtechnology 215 has been selected. As shown, a different set of attributes is associated with the demand category tab 220. In particular, an internal expert attribute $240_1$ may be used to identify any experts within a given organization, while the development status attribute $240_2$ may be used to identify specific projects within the organization which are using, testing or considering the subtechnology 215. In this fashion, a user may be able to quickly and conveniently identify the level of expertise in a given subtechnology within their own organization.

Figure 2D:
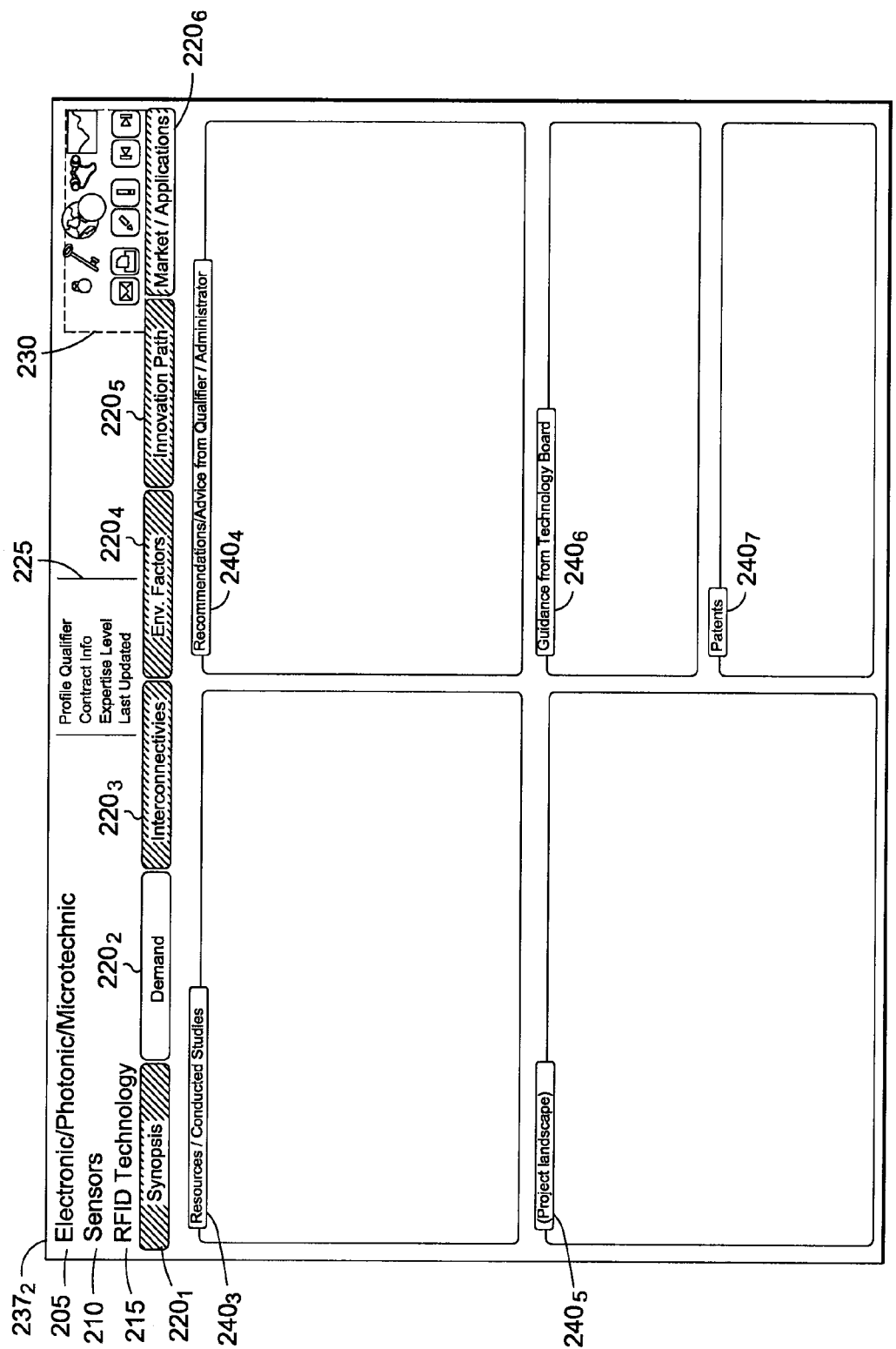

Referring now to FIG. 2D, one embodiment of another GUI $237_2$ is depicted showing additional attributes $240_3$-$240_7$ for the demand category tab $220_2$. In one embodiment, these additional attributes $240_3$-$240_7$ may be accessible by scrolling down or across the GUI $237_1$ and GUI $237_2$. In any event, GUI $237_2$ may be populated with information relating to any internal or organization-level resources and/or studies (attribute $240_3$), any recommendation or advice from the profile qualifier (attribute $240_4$), any upcoming projects relating to the subtechnology 215 (attribute $240_5$), guidance from the organization's technology board (attribute $240_6$) or any patents filed or issued relating to the particular subtechnology 215 (attribute $240_7$). Additionally, once a technology has been connected with an organization's relevant internal projects, as soon as new innovations emerge with the potential to modify or replace those technologies, the different project teams may be instantly notified without actively having to search for new innovations themselves.

Figure 2E:
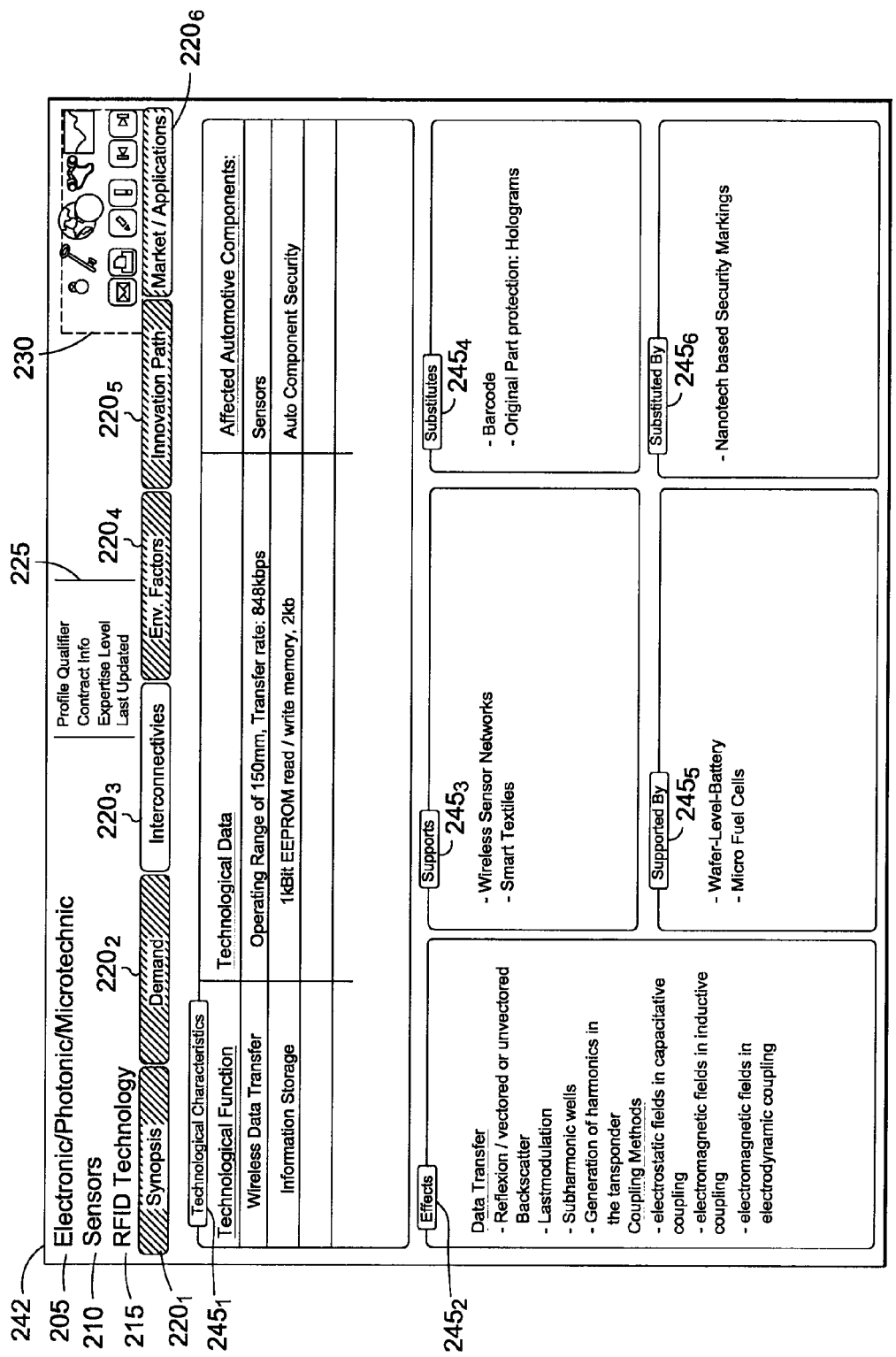

FIG. 2E depicts one embodiment of another GUI 242 after the interconnectivities tab $220_3$ for the subtechnology 215 has been selected. The set of attributes $245_1$-$240_6$ associated with the interconnectivities tab $220_3$ may relate to how the subtechnology 215 is related to one or more other subtechnologies. It has been recognized that one of the keys to progressive technology evolution stems from new innovations that either partially change or entirely replace currently deployed technology. This means that every technology, present or future, has the inherent capability to modify, be modified, replace or be replaced. This phenomenon is referred to herein as technology interconnectivity. To that end, technology interconnectivity may be captured as one or more subtechnology attributes organized under the interconnectivities tab $220_3$.

As shown in FIG. 2E, the exemplary interconnectivity attributes include a technological characteristics attribute $245_1$, which may be used to describe what the technology can achieve, the technologies physical characteristics, and affected components for particular applications. In addition, an effects attribute $245_2$ may be used to describe confirmed physical, chemical and biological effects or combinations thereof on which the subtechnology may be based. In addition, a description of which technologies are supported or enabled by the given subtechnology 215 may be included (attribute $245_3$), as well as what other technologies support or enable this subtechnology (attribute $245_5$). Similarly, what technologies may be substituted by or for the given subtechnology 215 may be included in the profile (attributes $245_4$ and $245_6$, respectively).

While FIG. 2E depicts only the interconnectivities tab $220_3$ as containing interconnectivity information, it should equally be appreciated that one or more of the other categories $220_1$-$220_6$ may similarly include such interconnectivity-type attributes in accordance with the principles of the invention.

Figure 2F:
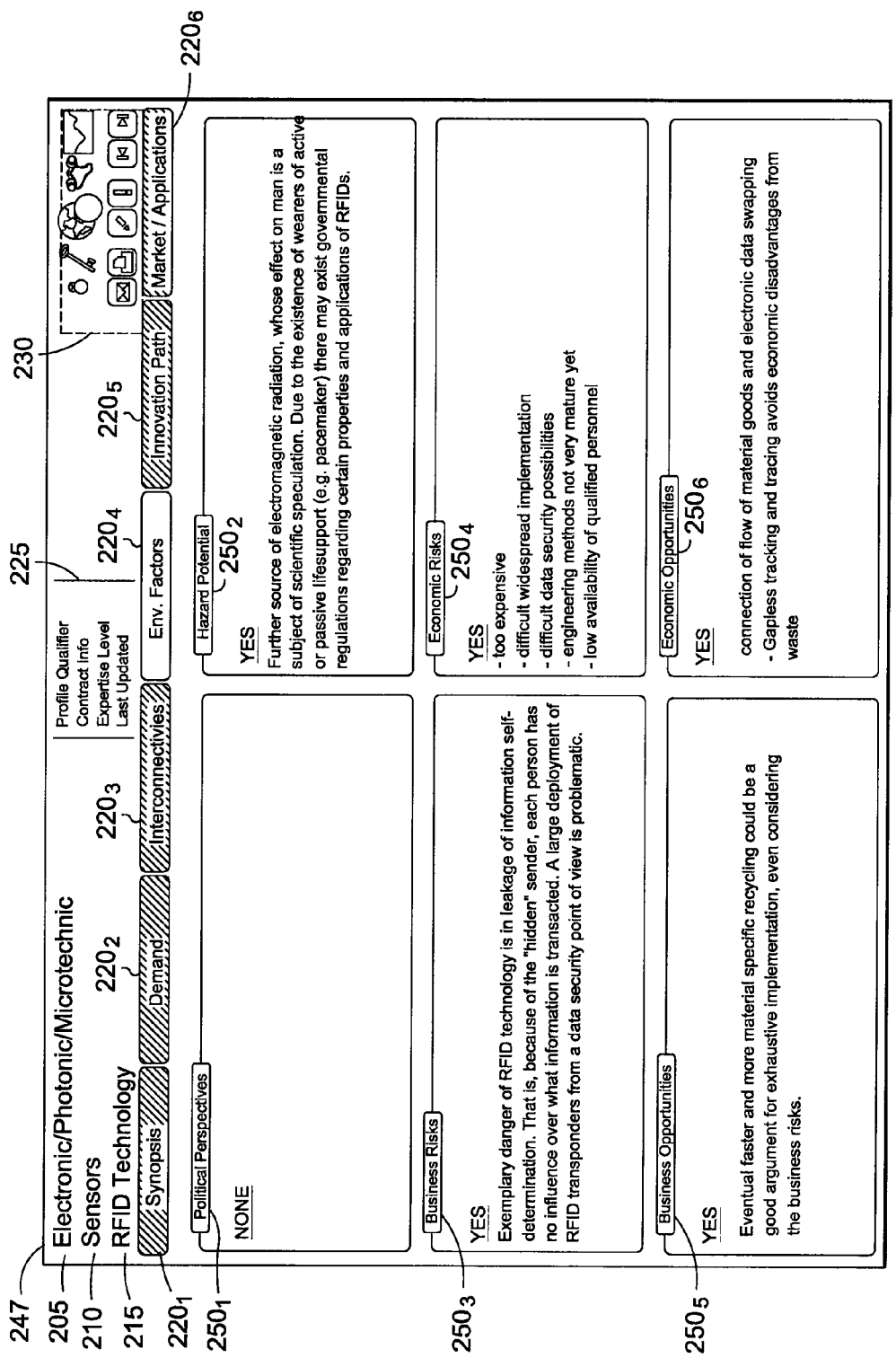

Referring now to FIG. 2F, depicted is one embodiment of a GUI 247 for the subtechnology profile relating to the RFID subtechnology 215 after the environmental factors tab $220_4$ has been selected. In one embodiment, the environmental factors category of attributes may be used to catalog any external or surrounding issues which may impact the viability or acceptability of the given subtechnology, including any known political perspectives on the subtechnology (attribute $250_1$), any potential hazards of using the subtechnology (attribute $250_2$), potential business and economic risks (attributes $250_3$ and $250_4$, respectively), evolving business and economic opportunities (attributes $250_5$ and $250_6$, respectively), etc.

Figure 2G:
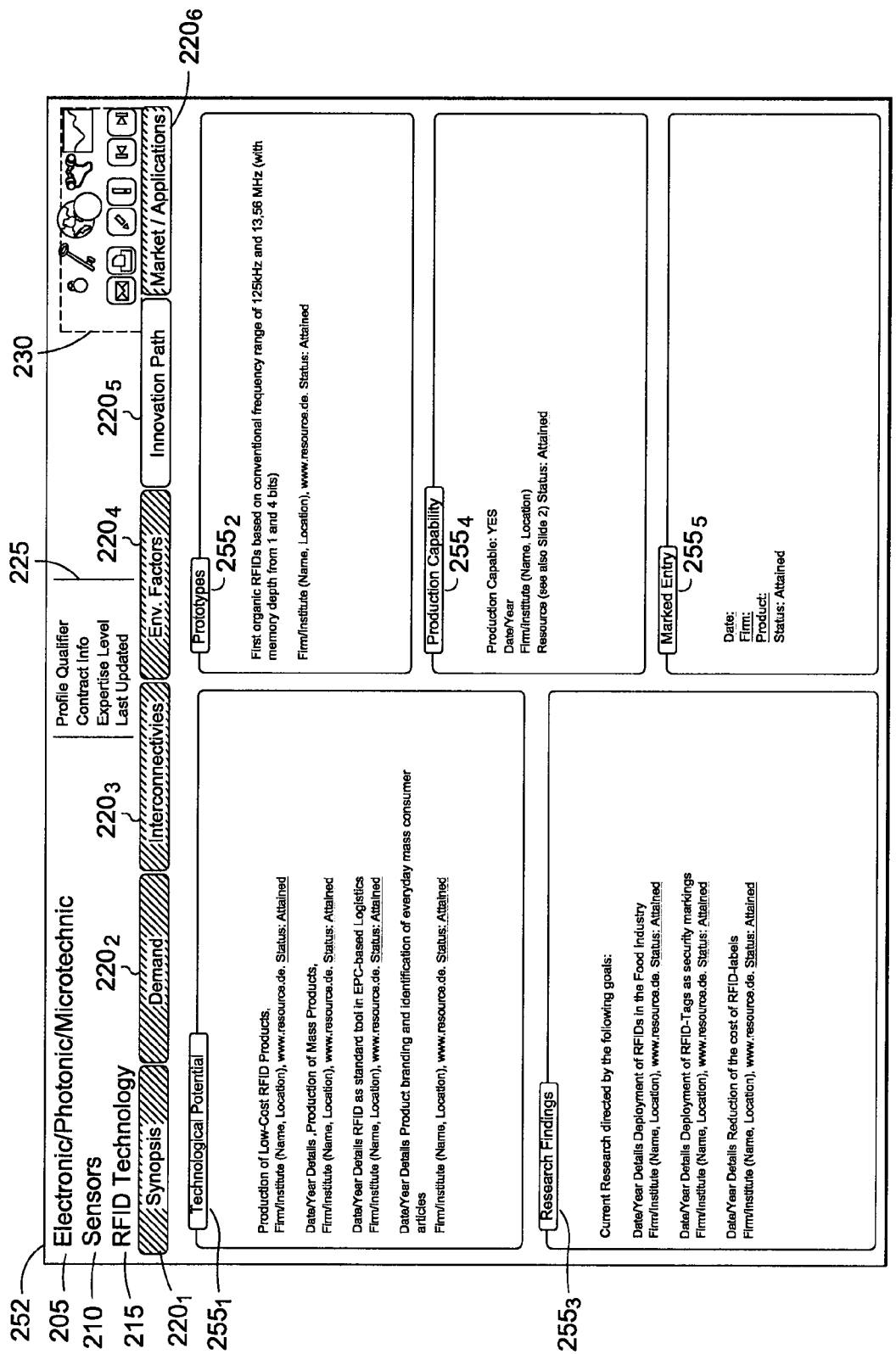

FIG. 2G depicts one embodiment of a GUI 252 for the subtechnology profile relating to the RFID subtechnology 215 after the innovation path tab $220_5$ has been selected. In one embodiment, the innovation path category of attributes may be used to catalog the engineering or development patch of the subtechnology 215. By way of example, under the innovation patch category the subtechnology profile can be supplemented with information relating to the future potential goals made achievable by the deployment of the given subtechnology (attribute $255_1$), any known prototype information (attribute $255_2$), a description of any research findings, such as milestones, relating to the subtechnology 215 (attribute $255_3$), known production capabilities (attribute $255_4$) and market entry information, if any (attribute $255_5$).

Figure 2H:
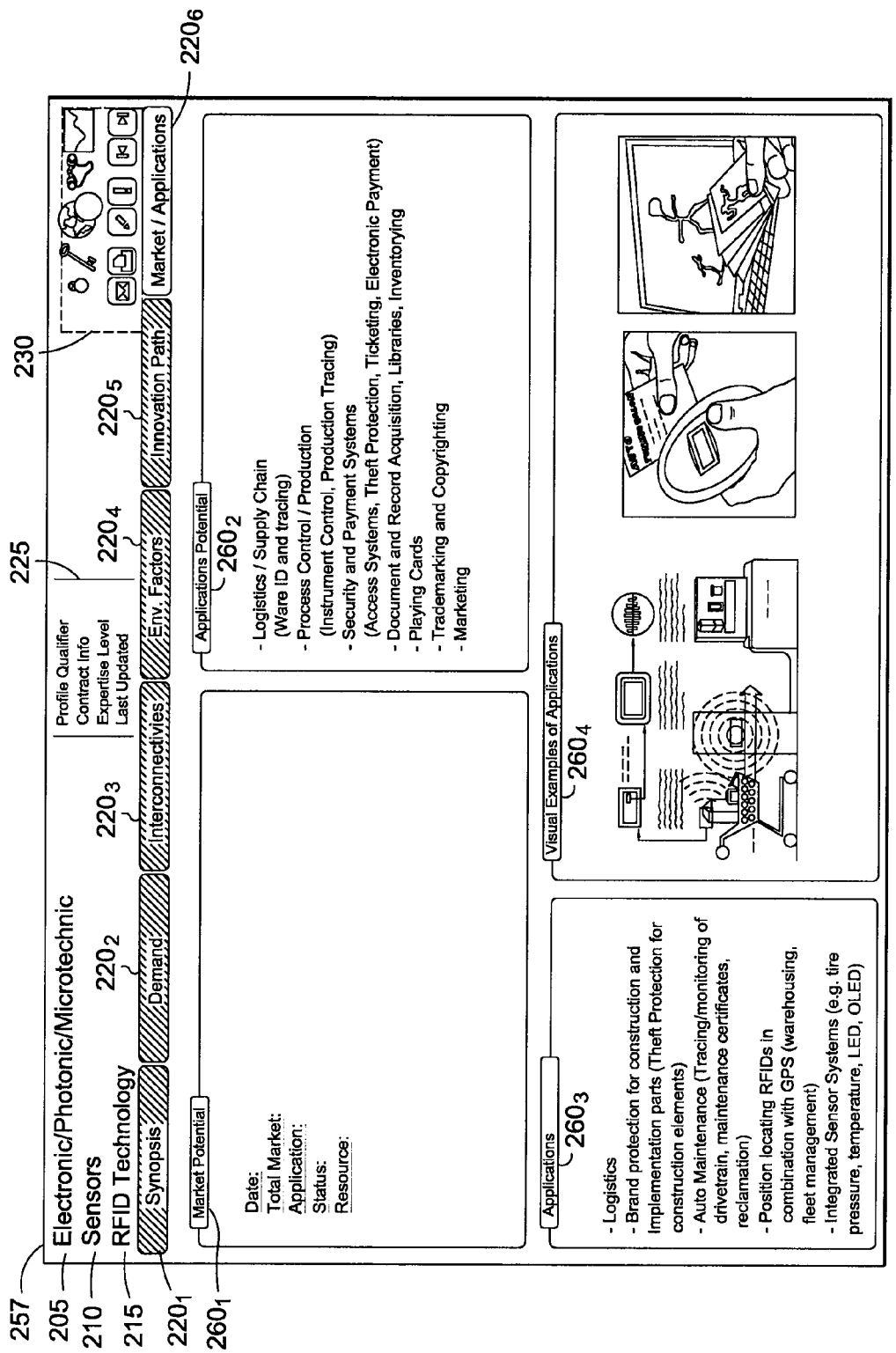

Finally, FIG. 2H depicts an embodiment of another GUI 257 for the subtechnology profile relating to the RFID subtechnology 215 once the market/applications tab $220_6$ has been selected. In one embodiment, the market/applications category of attributes may be used to catalog known information for market potential (attribute $260_1$), applications potential (attribute $260_2$), existing applications (attribute $260_3$) and visual examples thereof (attribute $260_4$). Of course, as previously mentioned, FIGS. 2A-2H include exemplary attributes which are not intended to limit the scope of the invention in any manner.

Exemplary Embodiments of the Invention

Figure 3:
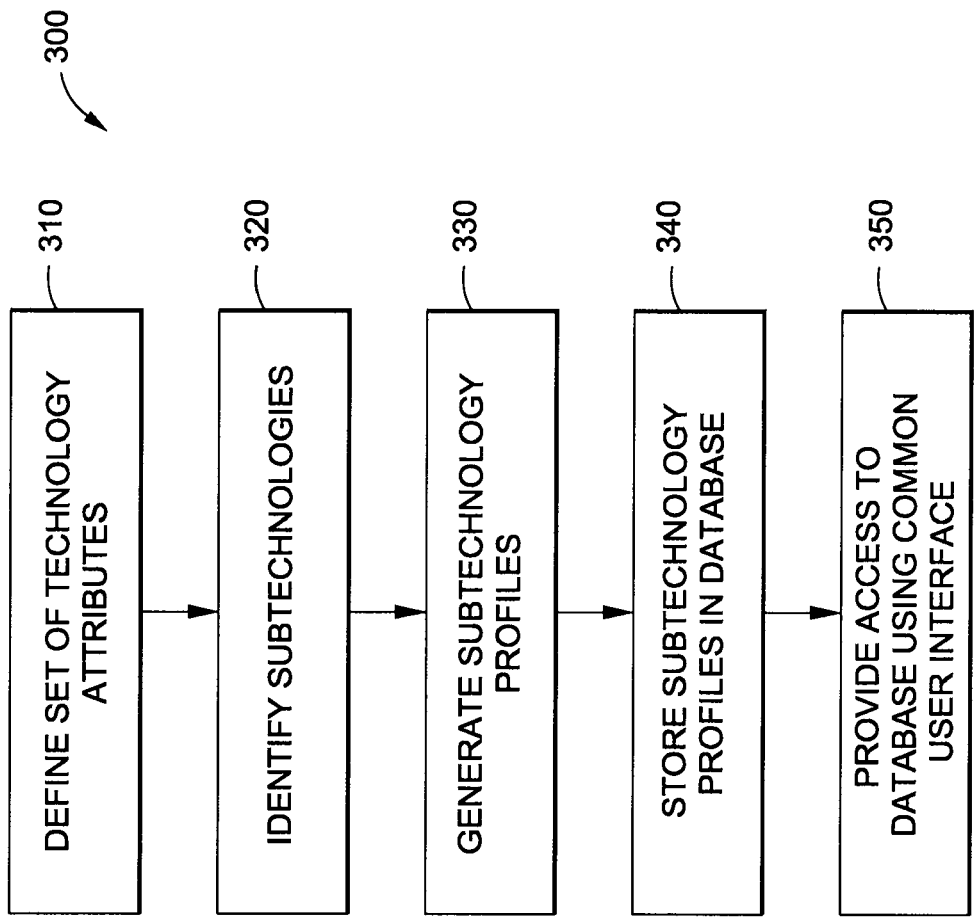
FIG. 3 depicts a flow diagram for one embodiment of a process for carrying out the invention.

Referring now to FIG. 3, depicted is one embodiment of a process 300 for carrying out one or more aspects of the invention. In particular, process 300 begins at block 310 where a predetermined set of technology attributes (e.g., attributes $235_1$-$235_6$, attributes $240_1$-$240_7$, attributes $245_1$-$245_6$, attributes $250_1$-$250_6$, etc.) may be defined. As previously described in detail, such technology attributes may correspond to set of predetermined traits that, when defined, may encompass everything from the basic description of a subtechnology to the intricate channels through which the world affects it, and it affects the world. Each individual attribute may contain a clip of information that outlines or describes a particular facet of a technology's existence and function. In one embodiment, the full collection of technology attributes defined at block 310 comprises a subtechnology profile. Moreover the defined set of attributes from block 310 may be consistent across all subtechnologies, thereby enabling the uniform comparison of all subtechnologies.

Process 300 may continue to block 320 where a plurality of subtechnologies may be identified. In one embodiment, each of the plurality of subtechnologies may be defined or characterized by a common granularity level. As described above, a subtechnology (e.g., subtechnology 215) may have a granularity level between that of a technology family (e.g., technology family 210) and a physical effect (such as electroluminescence). It should further be appreciated that, in order to achieve the optimal technology granularity level, and hence properly identify a subtechnology, a systematic set of guidelines and refinement routines may be applied until either a suitable or optimal subtechnology profile is achieved, or the technological concept is deemed outside the optimal complexity level and thus not a proper subtechnology.

Once a plurality of subtechnologies has been properly identified above at block 320, process 300 may then continue to block 330 where a plurality of subtechnology profiles may be generated. In one embodiment, these subtechnology profiles may correspond to each of the above-identified plurality of subtechnologies, and may be generated based on the previously-defined set of technology attributes (block 310). While it should be appreciated that numerous approaches may be used consistently with the principles of the invention, in one embodiment a GUI template (e.g., GUI template 200) may be used to enter the various technology attributes corresponding to each of the plurality of subtechnologies, thereby generating a plurality of subtechnology profiles. These subtechnology profiles may then be stored in a common technology database (e.g., database 110) at block 340. From there, a common user interface may be used to provide access to the database, and hence to the subtechnology profiles (block 350). In one embodiment, the common user interface may correspond to a GUI based on a template GUI, such as previously-described template GUI 200. In this fashion, an unlimited array of technologies may be researched, accessed and compared using a common structure and visual representation.

Figure 4:
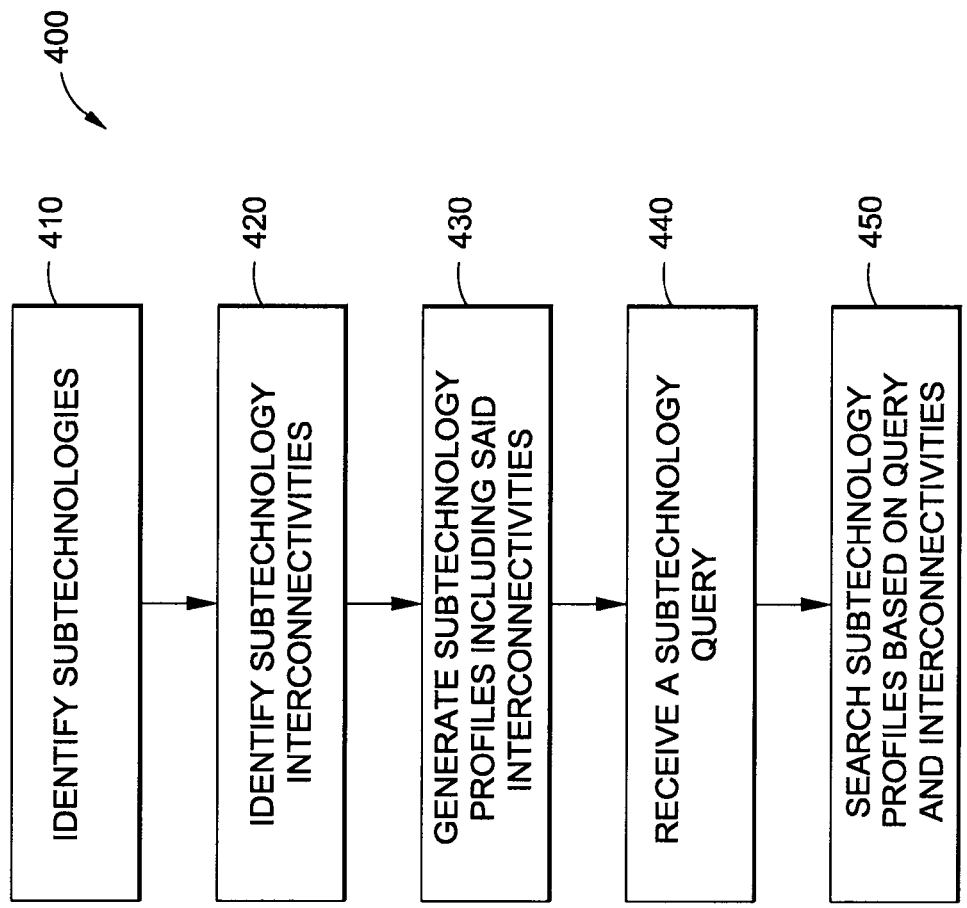
FIG. 4 depicts a flow diagram for another embodiment of a process for carrying out the invention.

Referring now to FIG. 4, depicted is another embodiment of a process 400 for carrying out one or more aspects of the invention. In particular, process 400 begins at block 410 where a plurality of subtechnologies may be identified. In one embodiment, each of the plurality of subtechnologies may be defined or characterized by a common granularity level. As described above, a subtechnology (e.g., subtechnology 215) may have a granularity level may be between that of a technology family (e.g., technology family 210) and a physical effect (such as electroluminescence). As with the embodiment described above with reference to FIG. 3, it should further be appreciated that, in order to achieve the optimal technology granularity level, and hence properly identify a subtechnology, a systematic set of guidelines and refinement routines may be applied until either a suitable or optimal subtechnology profile is achieved, or the technological concept is deemed outside the optimal complexity level and thus not a proper subtechnology.

Process 400 may then continue to block 420 where a plurality of subtechnology interconnectivities, relating to two or more of the identified plurality of subtechnologies, may correspondingly be identified. In one embodiment, the a plurality of subtechnology interconnectivities may be represented by a set of subtechnology attributes (e.g., attributes $245_1$-$245_6$) and may relate to how each of the plurality of subtechnologies may be related to one or more other subtechnologies.

In one embodiment, subtechnology interconnectivity may be characterized in the subtechnology's physical characteristics, the physical, chemical and biological effects or combinations thereof on which the subtechnology may be based, the technologies that are supported or enabled by the given subtechnology, the technologies that may be substituted by or for the given subtechnology, etc. As described above, one of the keys to progressive technology evolution stems from new innovations that either partially change or entirely replace currently deployed technology. That is, each and every technology has the inherent capability to modify, be modified, replace or be replaced by another technology. This technology interconnectivity may be identified and captured or represented as one or more subtechnology attributes at block 420.

Continuing to refer to FIG. 4, process 400 may then continue to block 430 where a plurality of subtechnology profiles may be generated, wherein the subtechnology profiles include the interconnectivities identified above at block 420. It should of course be appreciated that the subtechnology profiles generated at block 430 may further be based on a previously-defined set of technology attributes, which include one or more interconnectivity attributes. While it should be appreciated that numerous approaches may be used consistently with the principles of the invention, in one embodiment a GUI template (e.g., GUI template 200) may be used to enter the various technology attributes corresponding to each of the plurality of subtechnologies, thereby generating a plurality of subtechnology profiles. These subtechnology profiles may then be stored in a common technology database (e.g., database 110), which may be accessible using a common user interface, such as the previously-described template GUI 200.

Process 400 may then continue to block 440 where a subtechnology query may be received. While in one embodiment, the query may be a Boolean keyword query, in another embodiment the query may be comprised of a technological subject, problem or desired solution.

Based on the received query of block 440, process 400 may then continue to block 450 where the previously-generated plurality of subtechnology profiles may be searched based on both the received query of block 440, as well as the identified interconnectivities of block 420. In this regard, it should be appreciated that the system and methodology of the invention includes at least two searching regimes—text searching and connectivity searching. While the text search may rely on a standard database keyword search, the connectivity search provides a much more meaningful function in that it compares one or more attributes of subtechnology records to return a results list of related subtechnologies, which may or may not themselves contain the various search terms. In one embodiment, the attributes that are compared may relate to the interconnectivity of two or more subtechnologies.

In on embodiment, the interconnectivity attributes described above may be used to identify a solution to an engineering problem which may not be otherwise apparent to the engineer. By way of example, suppose an innovation engineer seeks to enhance the brightness of headlights without changing energy consumption or heat output. One embodiment of the invention would return a list of results for, not only any existing relevant subtechnologies, but would also be able to present a view of the entire extent to which the subtechnology exists in the world. In short, this is the essence of the connectivity search—to semantically determine what type of information a query asks for, then through known interconnectivities and various attribute comparisons, present possible technology solutions, including a view of the part of the world in which the technology has relevance. It should be appreciated that, in addition to using interconnectivity attributes to present more meaningful search results, it should equally be appreciated that other subtechnology attributes may be similarly utilized, whether individually or together.

Figure 5:
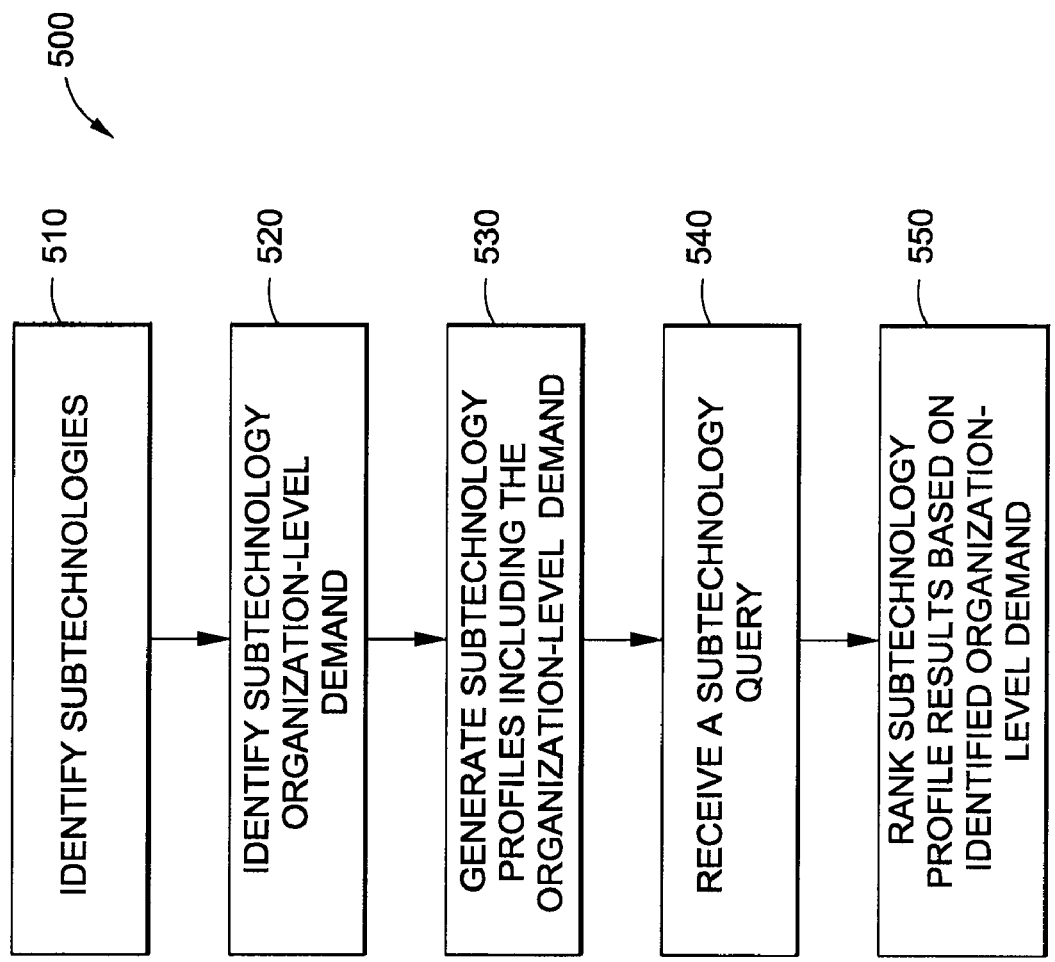
FIG. 5 depicts a flow diagram for still another embodiment of a process for carrying out the invention.

Referring now to FIG. 5, depicted is another embodiment of a process 500 for carrying out one or more aspects of the invention. In particular, process 500 begins at block 510 where, as with process 400, a plurality of subtechnologies may be identified. Again, each of the plurality of subtechnologies may be defined or characterized by a common granularity level between that of a technology family and a physical effect.

It has been found that simply making technological solutions achievable isn't quite enough unless they are connected with the relevant projects and personnel within a business or company utilizing the invention. To that end, process 500 may then continue to block 520 where the organization-level demand and/or expertise, for each of the identified plurality of subtechnologies, may correspondingly be identified. In one embodiment, this organization-level demand and/or expertise may be represented by a set of subtechnology attributes (e.g., attributes $240_1$-$240_7$) and may provide the ability to both link the internal demand for the underlying information with the external information itself. In certain embodiments, the invention may also provide a quantitative comparison of a technology's general relevance with the internal relevance potential as it relates to a given company or organization.

Continuing to refer to FIG. 5, process 500 may then continue to block 530 where a plurality of subtechnology profiles may be generated, wherein the subtechnology profiles include the organization-level demand attributes identified above at block 520. As described above, however, it should further be appreciated that the subtechnology profiles generated at block 530 may also include additional, predefined technology attributes. Moreover, as with the processes of FIGS. 3-4, a GUI template (e.g., GUI template 200) may be used to enter the various technology attributes corresponding to each of the plurality of subtechnologies, thereby generating a plurality of subtechnology profiles. These subtechnology profiles may then be stored in a common technology database (e.g., database 110), which may be accessible using a common user interface, such as the previously-described template GUI 200.

Process 500 may then continue to block 540 where a subtechnology query may be received. As with the process of FIG. 4, the received at block 540 may be a Boolean keyword query, in another embodiment the query may be comprised of a technological subject, problem or desired solution. Based on the received query of block 540, process 500 may then continue to block 550 where, following a search of the underlying technology database (e.g., database 110), a plurality of subtechnology search results may be ranked based on the identified organization-level demand information of block 520. In this fashion, the most relevant technologies, not only to a particular engineering discipline, but also to a particular organization, may be quickly identified. In other embodiments, the ranking of the subtechnology search results may be based, at least in part, on a quantitative comparison of the subtechnology's general relevance to the user, with the internal relevance to the user's company or organization.

In still another embodiment, once a subtechnology has been associated with an particular project, project members may be automatically alerted to any new innovations which have the potential to modify or replace the subject subtechnology.

It should further be appreciated that, with respect to each of the processes described above with reference to FIGS. 3-5, one aspect of the invention is to provide a semantic network (e.g., organization-level network 105 of FIG. 1), which is configured to utilize a special form of knowledge representation that in turn allows a system to not only deal with the transfer of information, but also designate a type to that information. The importance of this is related to the attribute structure described in detail above, whereby a certain type of information (e.g., the attribute title) is defined, followed by the information itself (e.g., the contents of the attribute). When used in conjunction with advanced searching algorithms, this methodology allows the invention to determine what type of information is relevant to a query (e.g., which attribute) then display or manipulate the information itself (e.g., the contents of the attribute). This is the basis behind semantically determining the relevance between an inputted query and the information in the technology database.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:
1. A method for utilizing organization-level technology demand information comprising the acts of:
   identifying a plurality of subtechnologies across a plurality of different unrelated fields of technology, wherein each of the plurality of subtechnologies is characterized by a common granularity level;
   identifying subtechnology demand information for one or more of the plurality of subtechnologies;

generating a plurality of subtechnology profiles corresponding to said plurality of subtechnologies, wherein each of said plurality of subtechnology profiles is a collection of the technology attributes, as has been defined for each of the corresponding plurality of subtechnologies, wherein each individual technology attribute that comprises said collection is defined for each of the plurality of subtechnologies, and wherein each individual technology attribute includes technology-specific information describing a particular facet of a technology's existence or function, and such technology-specific information specifically including the subtechnology demand information, wherein the subtechnology demand information further links a particular organization's internal demand for such technology-specific information with the technology-specific information itself;

receiving a subtechnology query from a user; and ranking a plurality of subtechnology search results based on said subtechnology demand information, wherein said ranking of the subtechnology search results is further based, at least in part, on a quantitative comparison of a subtechnology's general relevance to the user, with its internal relevance to the particular organization.

2. The method of claim 1, further comprising searching the plurality of subtechnology profiles based on said subtechnology query to generate the plurality of subtechnology search results.

3. The method of claim 1, wherein the common granularity level comprises a level of technological complexity between a technology family and a physical effect.

4. The method of claim 1, wherein identifying the plurality of subtechnologies comprises identifying the plurality of subtechnologies by applying a predetermined selection procedure across different technological fields.

5. The method of claim 1, wherein prior to generating the plurality of subtechnology profiles, the method further comprises receiving technology attributes for said plurality of subtechnologies via a template graphical user interface.

6. The method of claim 1, further comprising storing the plurality of subtechnology profiles in a technology database.

7. The method of claim 6, further comprising providing access to said technology database using a common user interface.

8. The method of claim 1, wherein the subtechnology demand information corresponds to organization-level information relating to at least one of particular experts and projects within a given organization for a given subtechnology.

9. The method of claim 1, wherein the set of technology attributes further includes technology interconnectivity attributes.

10. The method of claim 9, wherein the set of technology attributes further includes innovation path and market/applications attributes.

11. The system of claim 1, wherein the set of technology attributes further includes technology interconnectivity attributes.

12. The system of claim 11, wherein the set of technology attributes further includes innovation path and market/applications attributes.

13. A system for utilizing organization-level technology demand information comprising:

a network;
a technology database; and
a server coupled to the technology database and to the network, wherein the server includes processing circuitry to execute programming code to,
identify a plurality of subtechnologies across a plurality of different unrelated fields of technology, wherein each of the plurality of subtechnologies is characterized by a common granularity level,
identify subtechnology demand information for one or more of the plurality of subtechnologies,
generate a plurality of subtechnology profiles corresponding to said plurality of subtechnologies, wherein each of said plurality of subtechnology profiles is a collection of the technology attributes, as has been defined for each of the corresponding plurality of subtechnologies, wherein each individual technology attribute that comprises said collection is defined for each of the plurality of subtechnologies, and wherein each individual technology attribute includes technology-specific information describing a particular facet of a technology's existence or function, and such technology-specific information specifically including the subtechnology demand information, wherein the subtechnology demand information further links a particular organization's internal demand for such technology-specific information with the technology-specific information itself,
receive a subtechnology query, and
rank a plurality of subtechnology search results based said subtechnology demand information, wherein said ranking of the subtechnology search results is further based, at least in part, on a quantitative comparison of a subtechnology's general relevance to the user, with its internal relevance to the particular organization.

14. The system of claim 13, wherein the server is further to search the plurality of subtechnology profiles based on said subtechnology query to generate the plurality of subtechnology search results.

15. The system of claim 13, wherein the common granularity level comprises a level of technological complexity between a technology family and a physical effect.

16. The system of claim 13, wherein the server is further to identify the plurality of subtechnologies by applying a predetermined selection procedure across different technological fields.

17. The system of claim 13, wherein prior to generating the plurality of subtechnology profiles, the server is further to receive technology attributes for said plurality of subtechnologies via a template graphical user interface.

18. The system of claim 13, wherein the server is further to store the plurality of subtechnology profiles in a technology database.

19. The system of claim 18, wherein the server is further to provide access to said technology database using a common user interface.

20. The system of claim 13, wherein the subtechnology demand information corresponds to organization-level information relating to at least one of particular experts and projects within a given organization for a given subtechnology.

* * * * *